US 6,687,779 B1

(12) United States Patent
Sturm et al.

(10) Patent No.: US 6,687,779 B1
(45) Date of Patent: Feb. 3, 2004

(54) METHOD AND APPARATUS FOR TRANSMITTING CONTROL INFORMATION ACROSS A SERIALIZED BUS INTERFACE

(75) Inventors: Gordon L. Sturm, Dallas, TX (US); Nilay Mitash, Murphy, TX (US); Mohammad Jahidur Rahman, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 484 days.

(21) Appl. No.: 09/616,105

(22) Filed: Jul. 14, 2000

(51) Int. Cl.⁷ .............................................. G06F 13/14
(52) U.S. Cl. .................................................... 710/305
(58) Field of Search ................................ 710/109, 315, 710/305, 14

(56) References Cited

U.S. PATENT DOCUMENTS

| | | | |
|---|---|---|---|
| 4,486,739 A | 12/1984 | Franaszek et al. | 340/347 DD |
| 5,751,975 A | 5/1998 | Gillepie | 395/306 |
| 5,764,924 A | 6/1998 | Hong | 395/281 |
| 5,875,313 A | 2/1999 | Sescila, III et al. | 395/309 |
| 5,887,039 A | 3/1999 | Suemura et al. | 375/365 |
| 5,937,175 A | 8/1999 | Sescila, III et al. | 395/309 |
| 5,940,018 A | 8/1999 | Kim et al. | 341/94 |
| 5,968,144 A | 10/1999 | Walker et al. | 710/28 |
| 5,968,172 A | 10/1999 | Aleshi | 713/1 |
| 6,003,105 A | 12/1999 | Vicard et al. | 710/129 |
| 6,070,214 A | 5/2000 | Ahern | 710/128 |
| 6,161,157 A * | 12/2000 | Tripathi et al. | 710/109 |
| 6,380,873 B1 * | 4/2002 | Priborsky et al. | 710/57 |
| 6,418,494 B1 * | 7/2002 | Shatas et al. | 710/305 |
| 6,459,700 B1 * | 10/2002 | Hoang | 370/401 |
| 6,516,352 B1 * | 2/2003 | Booth et al. | 709/250 |
| 6,529,977 B1 * | 3/2003 | Nyu | 710/100 |
| 2001/0032283 A1 * | 10/2001 | Chen et al. | 710/200 |

FOREIGN PATENT DOCUMENTS

| EP | 0 817 088 A2 | 1/1998 |
|---|---|---|
| EP | 0 923 035 A2 | 6/1999 |

OTHER PUBLICATIONS

Main, Kevin, Texas Instruments, Inc. "WinHEC Presentation," Presented circa Apr., 2000.
Texas Instruments, Inc. "Serial PCI–to–PCI Bridge Technology," Presented circa Jun., 2000.
Texas Instruments, Inc. "PCI2050, 32–BIT, 33 MHz PCI–to–PCI Bridge, Compact PCI Hot–Swap Friendly, 9–Master, Microstar Packaging," 2000.
Texas Instruments, Inc., "TLK25001RCP 1.6 Gbps to 2.5 Gbps Transciever," Jan., 2000.

* cited by examiner

Primary Examiner—Paul R. Myers
(74) Attorney, Agent, or Firm—J. Dennis Moore; W. James Brady, III; Frederick J. Telecky, Jr.

(57) ABSTRACT

A bus interface device includes a parallel input configured to be coupled to a bus (20), such as a primary PCI bus. The device also includes a parallel data output (TXD) and at least two control output nodes (TX_ER and TX_EN). Data control circuitry coupled to the control output nodes utilizes a coding scheme (e.g., an 8B/10B scheme) to generate one of a set of control codes (e.g., Idle, Extend, Normal Data and Error) to be provided to the control output nodes. The device also includes reset control circuitry that generates a specified sequence of control codes (e.g., a sequence of Idle's and Extend's) on the control outputs. This sequence can be used to communicate information such as a signal (e.g., reset signal) and/or a mode (e.g., a CRC mode).

11 Claims, 4 Drawing Sheets

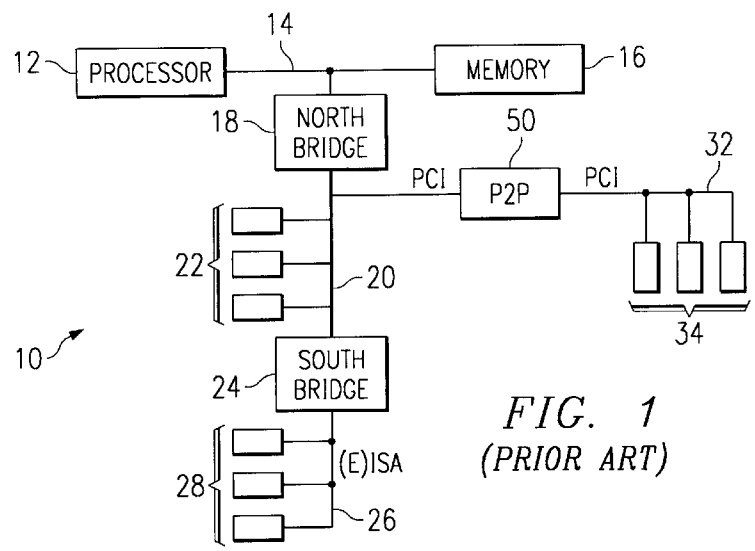
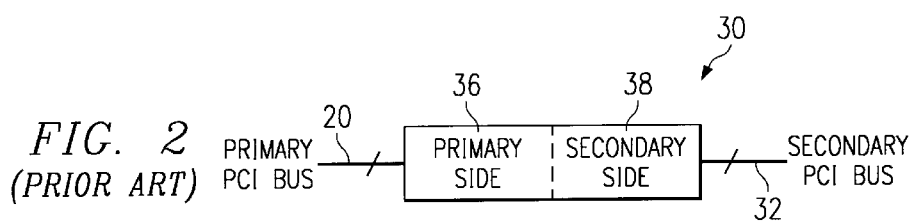
FIG. 1 (PRIOR ART)
FIG. 2 (PRIOR ART)
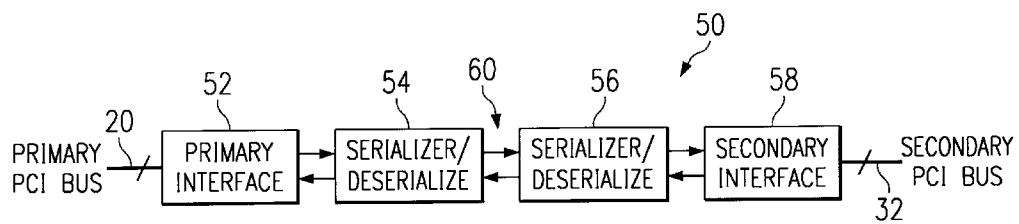
FIG. 3
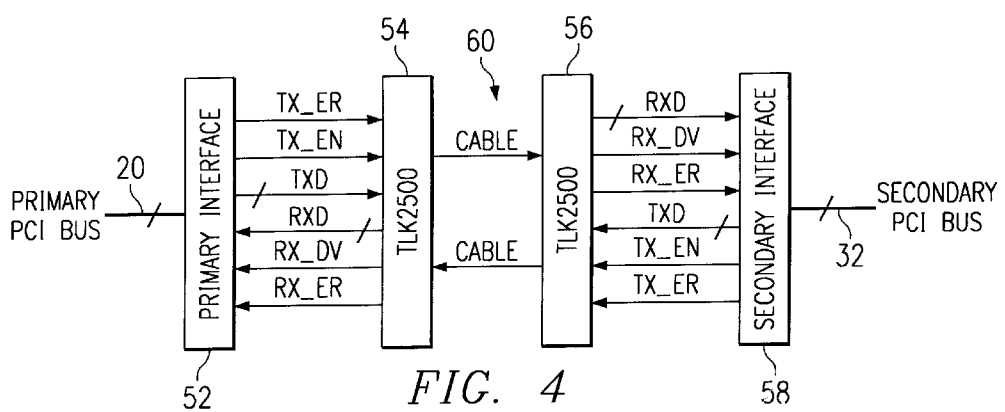
FIG. 4

METHOD AND APPARATUS FOR TRANSMITTING CONTROL INFORMATION ACROSS A SERIALIZED BUS INTERFACE

FIELD OF THE INVENTION

This invention relates generally to computer systems and components and specifically to a method and apparatus for transmitting control information across a serialized bus interface.

BACKGROUND OF THE INVENTION

Computer system architectures are typically designed with standardized busses that can include slots. Various devices can be coupled to the system via these slots. Examples of standardized busses include the Peripheral Component Interface (PCI) bus, the Industry Standard Architecture (ISA) bus and the Extended Industry Standard Architecture (EISA) bus.

FIG. 1 illustrates a block diagram of a conventional computer system 10. Processor 12 may be an x86 compatible microprocessor such as the Pentium (II or III) available from Intel Corporation or the equivalent processor (e.g., K6 or K7) available from Advanced Micro Devices.

The processor 12 is coupled to a processor bus 14, which is typically proprietary (e.g., not standardized) to the processor 12. The bus 14 is coupled to a memory system 16. The memory system 16 includes dynamic random access memory (DRAM) as well as associated control circuitry.

Processor bus 14 is also coupled to a PCI bus 20 through a bridge circuit 18, often referred to as a north bridge. In some instances, the memory control circuitry from memory system 16 and the bridge circuitry are combined in a single chip. In this case, not illustrated, the north bridge 18 would be coupled between processor 12 and memory 16.

PCI bus 20 includes a number of slots 22 that can be used to couple various devices to the bus. For example, the slots could be used to coupled devices such as hard disk drives, modems, network interface cards, optical drives (e.g., CD ROM or DVD), or other devices.

PCI bus 20 is coupled to a legacy bus, typically an ISA or EISA bus 26, through a second bridge circuit 24, often referred to as a south bridge. The (E)ISA bus 26 includes slots 28 typically used for input/output devices such as the keyboard, mouse, display and other devices such as the non-volatile memory.

The PCI bus 20 is a standardized bus and therefore can include only a limited number of slots 22. If more slots are needed, a second PCI bus 32 can be coupled to the first PCI bus 20 through a PCI-to-PCI bridge circuit (P2P) 30. In this configuration, the PCI bus 20 coupled to the north bridge is referred to as the primary PCI bus and the second PCI bus 32 is referred to as the secondary PCI bus. The secondary PCI bus 32 includes slots 34 that can be utilized in the same manner as slots 22. In fact, from the perspective of an operating system being executed on processor 12 primary PCI bus 20 and secondary PCI bus 32 appear to be a single PCI bus.

SUMMARY OF THE INVENTION

The preferred embodiment present invention provides a scheme that can be used to transmit control signal from one parallel bus to a second parallel bus over a serial link. While not limited to a single type of system, the preferred embodiment of the present invention was developed initially in the context of a PCI-to-PCI bridge that includes a serial link. This type of configuration provides advantages in a number of situations such as when the secondary PCI bus is separated from the primary PCI bus.

A serial PCI-to-PCI bridge is different from a conventional PCI-to-PCI bridge in the respect that it has a serial link between the two PCI interfaces. Each PCI interface is typically a separate entity or a separate chip. Both the interface chips can communicate between them in two modes of operation through the serial link. One problem addressed by the preferred embodiment involves resetting the secondary PCI interface device and another is initializing both the parts to the same mode so that they can start communicating data between them.

In one aspect, the present invention discloses a bus interface device includes a parallel input configured to be coupled to a bus, such as a primary PCI bus. The device also includes a parallel data output and at least two control output nodes. Data control circuitry coupled to the control output nodes utilizes a coding scheme (e.g., an 8B/10B scheme) to generate one of a set of control codes (e.g., Idle, Extend, Normal Data and Error) to be provided to the control output nodes. The device also includes reset control circuitry that generates a specified sequence of control codes (e.g., a sequence of Idle's and Extend's) on the control outputs. This sequence can be used to communicate information such as a signal (e.g., reset signal) and/or a mode (e.g., a CRC mode).

The device can be used in a computer system, such as for communicating from a processor to a peripheral device. For example, the device can be used to transmit a reset signal from a processor to a remote PCI bus. The processor would communicate an indication that the system is being reset along at least one line of a parallel bus, e.g., a primary PCI bus. The indication would be received at a first interface device and communicated along a serial link using control codes of an encoding/decoding scheme of the interface device. The indication would then be received at a second interface device, which may in turn be coupled to a second parallel bus such as a secondary PCI bus.

BRIEF DESCRIPTION OF THE DRAWINGS

The above features of the present invention will be more clearly understood from consideration of the following descriptions in connection with accompanying drawings in which:

FIG. 1 is a block diagram of a conventional computer system;

FIG. 2 is a block diagram of a conventional PCI-to-PCI bridge;

FIG. 3 is a block diagram of a PCI-to-PCI bridge of the present invention;

FIG. 4 is a block diagram of a more specific PCI-to-PCI bridge of the present invention;

DETAILED DESCRIPTION OF ILLUSTRATIVE EMBODIMENTS

Figure 5:
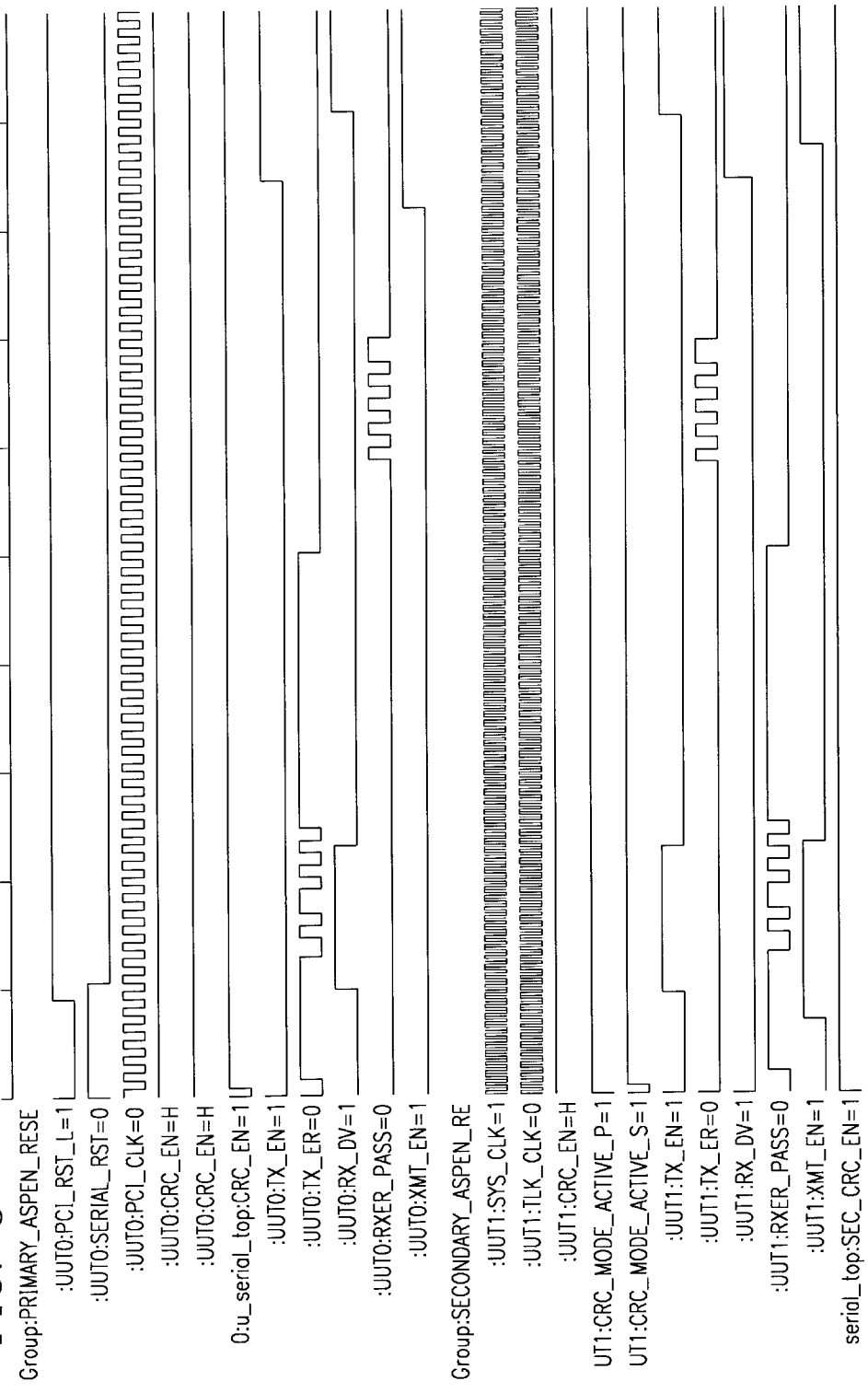
FIGS. 5 and 6 are timing diagrams illustrating the operation of a preferred embodiment of the present invention.

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

The present invention will be described in the context of a specific example, namely a PCI-to-PCI bridge. When utilized in this manner, a unique computer system can be derived. This system can be useful in a number of specific applications such as with a portable computer/docking station, small form factor PC expansion and in telecommunications environments. Other applications and embodiments can also be utilized.

Referring back to prior art FIG. 1, a PCI-to-PCI bridge 30 is a link between a primary PCI bus 20 and a secondary PCI bus 32. A conventional PCI-to-PCI bridge 30, illustrated in FIG. 2, is formed from a single chip, i.e., a single piece of silicon. As shown in the figure, this device can be logically divided between a primary side 36 and a secondary side 38. The primary side 36 is the interface to the primary PCI bus 20 and the secondary side 38 of the P2P 30 is the interface to the secondary PCI bus 32.

The PCI-to-PCI bridge 30 follows the PCI bridge protocol to transfer data between the two buses 20 and 32. The primary side 36 can set the secondary side 38 to different states or modes of operation depending on the need of the system. When it is needed to set the secondary side 38 to the initial state, the primary side 36 can issue a signal called RESET to the secondary side 38 thereby causing the secondary side 38 to enter the initial state. The RESET signal on the PCI bridge's secondary side 38 can be asserted under certain conditions.

When the primary PCI bus 20 wants to bring the bridge 30 to its initial state and issues a RESET signal to primary side 36 of the bridge 30, the bridge 30 must assert RESET on the secondary side 38 as well. This action will initialize the entire bus 20/32 to the initial state. In another instance, the bridge 30 asserts RESET on the secondary side 38 whenever software sets the SECONDARY BUS RESET bit in the bridge's bridge control register.

The bridge 30 may also need to initialize the secondary side 38 and assert RESET under certain other conditions. For example, when the system 10 is powered on, it may want to bring all the components in the system to an initial state and issue a RESET to all the components as a global reset. This global reset needs to be communicated to the secondary side 38. In another situation during the operation of the bridge 30, it may be desirable to bring the secondary side 32 to the initial state before transitioning to a next phase of operation. The bridge 32 may also need to reset the secondary bus 32 if there is a change in the mode of power states.

For conventional bridges it is easy to convey the reset signal from the primary side 36 to the secondary side 38 because both the sides remain in the same chip. So, a signal can be generated from the primary side 36 for the above conditions and the information can be transferred to the secondary easily. For example, the transfer might be as simple as routing a line of metal across the chip and gating that line appropriately.

The preferred embodiment of the present invention, however, deals with a split PCI-to-PCI bridge. In this case, the primary side and the secondary side of the PCI-to-PCI bridge are formed in separate devices, e.g., separate pieces of silicon that are coupled together, in this case by a serial link. As a result, it is not possible to simply route a metal line over the substrate to provide control signals from the primary side to the secondary side.

The preferred embodiment of the present invention provides a PCI interface device (52 or 58 in FIG. 3) that can serve as a half PCI bridge. This device can be used either as a primary or a secondary part of a bridge. As a primary interface device, it is coupled to the primary PCI bus 20 and as a secondary interface device it is coupled to the secondary PCI bus 32.

FIG. 3 illustrates a PCI-to-PCI bridge 50 of the present invention. In this example, the PCI-to-PCI bridge 50 is formed from four chips. The primary interface device 52 is coupled to the secondary interface 58 through a serial link 60. The serial link 60 is accessed by transceiver, e.g., serializer/deserializer, devices 54 and 56. The present invention contemplates an embodiment where the primary interface 52 and the transceiver 54 are combined into a single device and the secondary interface 58 and the transceiver 56 are combined into another single device.

Preferably, the system is fully symmetric so that either PCI bus could be the primary bus. With this preference in mind, the interface devices 52 and 58 and the transceivers 54 and 56 may include substantially identical circuitry.

In the preferred embodiment, serial link 60 is a single-channel, bi-directional, point-to-point interface. Preferably, serial link 60 comprises a differential pair of wires for communication from transceiver 54 to transceiver 56 and a second differential pair of wires for communication from transceiver 56 to transceiver 54. Single-ended wires could alternatively be used. Data signals and control signals share the same line. In operation, the system's coding scheme is used to differentiate data from control. This type of configuration is convenient since it can utilize a standard category 5 cable, such as the cables used in regular Ethernet applications. In an alternate embodiment, the invention could be implemented with a single differential pair or single-ended wire in a half duplex system.

In the preferred embodiment system, interface devices 52 and 58 are coupled together by a pair of serializer/deserializer devices 54/56 used for ultra high speed bi-directional point-to-point data transmissions. In the preferred embodiment, the serializer/deserializer devices 54 and 56 are TLK2500 transceivers available from Texas Instruments Incorporated. The TLK2500 has a fixed number of pins and a predetermined modes of operation. The reset information from primary interface device 52 to secondary interface device 58 needs to be communicated through both the transceivers 54 and 56. Unfortunately, there is no direct way to communicate the reset signal to the secondary from the primary side.

In some systems the data transfer between a primary 52 and a secondary 58 interface device can occur in more than one mode. For example, in the preferred embodiment, data transfer can occur in either CRC (cyclic redundancy code) mode or non-CRC mode. In the CRC mode data is transferred more reliably than non-CRC mode but the redundancy bits lower the bandwidth available for data transfer. Due to these two modes of operation, both the interface devices 52 and 58 should be in the same data transfer mode for proper recognition of data packets. In other words, when there is a change in mode in the primary interface device 52, the secondary interface device 58 should also change to the same mode for proper data communication. Again, the secondary side 58 should be set to initial state after each change in CRC mode before proper transaction of data can be made.

In one aspect, the present invention provides a technique to communicate a RESET signal in a proper fashion not only to set the secondary interface device 58 to an initial state but also to set the mode of transaction between two interface devices 52 and 58. In the preferred embodiment, when RESET goes active, a pattern of signals is sent from the primary device 52 to the secondary device 58 using the control lines of transceivers 54 and 56. In this manner, the system takes advantage of control codes provided by the line coding system.

As an example, transceivers 54 and 56 might utilize a 8B/10B encoding and decoding scheme. EEE Standard 802.3, §36.2.4 provides details of the 8B/10B code. Rather than repeat the information provided in the standard here, IEEE Standard 802.3 is incorporated herein by reference.

This encoding/decoding scheme can be implemented on-chip with the TLK2500. The encoding scheme has predetermined control codes that are distinguishable from data codes. The serial link 60 can be driven with these codes to communicate the RESET from the primary interface device 52 to the secondary interface device 58. By accessing control codes in the 8B/10B control space, the reset and mode information can be communicated independent of user data.

Different side-band signals can also be communicated from primary side 52 to secondary side 58 with this procedure. Different patterns can be inserted to communicate different signals and different headers can be used to make different groups of signals. So, any bit in a secondary side register or a primary side register can be set or read from the other side and the signals could be communicated to the proper input, output or the internal circuitry.

FIG. 4 illustrates a specific example that utilizes aspects of the present invention. This embodiment includes circuitry within the interface devices 52 and 58 that can be used to communicate control information between these two devices. This circuitry helps to keep the interface devices in the same CRC mode of operation and communicate the RESET signal from primary interface device 52 to secondary interface device 58 through both the transceivers 54 and 56 as shown in FIG. 4.

The implementation of FIG. 4 is based on the TLK2500. The TLK2500 performs data parallel-to-serial, serial-to-parallel, and clock extraction functions for a physical layer interface device. The parallel data is internally encoded using an 8B/10B encoding format. The resulting work can then be transmitted differentially at a high speed reference clock rate. The device also includes a receiver section that performs serial-to-parallel conversion on the input data synchronizing the received data to an extracted reference clock. It then decides the data using 8B/10B decoding format to derive the original parallel data.

In the preferred embodiment, the interface 52 or 58 to the TLK2500 is 16 bits wide and operates at 125 MHz. This interface has a raw throughput of 250 million bytes per second. The transmit data rate from interface 52 or 58 to TLK2500 is the same as the receive data rate from the TLK2500 to interface 52 or 58. The interface 52 or 58 to the PCI bus operates at 33 MHz and is 32 bits wide. That PCI interface has a raw throughput of 133 million bytes per second. The excess throughput on the TLK2500 interface is used up in packet overhead, CRC codes, protocol delays, etc. Based upon simulations, the combined link can sustain about 120 million bytes per second for an extended period.

The PCI bus specification also permits higher speeds, up to 66 MHz and wider widths, up to 64 bits wide. That would require about four times the throughput on the TLK2500 link. The present invention contemplates an embodiment that supports this kind of high speed bus by a combination of faster clock rates on the high speed serial data and/or running several high speed serial channels in parallel.

Advantageously, the Reset/CRC protocols operate at a at the high speed clock rates rather that at the PCI clock rates. The advantage is that they operate faster, allowing faster error recovery and/or faster mode changes than a pure PCI-based implementation.

The TLK2500 includes an 8B/10B encoder that converts 8 bit wide data to a 10 bit wide encoded data character to improve its transmission characteristics. Since the TLK2500 is a 16 bit wide interface the data is split into two 8-bit wide bytes for encoding. Each byte is fed into a separate encoder.

The data transfer through the TLK2500 depends on four control pins. These pins are called TX_EN (transmit enable), TX_ER (transmit error coding), RX_DV (receive data valid) and RX_ER (receive error). The device also has 32 data pins, TXD[0:15] (transmit data) and RXD[0:15] (receive data). During data transmission from either interface device, data is presented to TXD pins and TX_EN and TX_ER are used as control pins. RXD pins are used to receive the transmitted data in the other interface device with the control pins RX_DV and RX_ER. The state of TX_EN and TX_ER pins are replicated in the receive side in RX_DV and RX_ER pins. The control pins TX_EN and TX_ER can have four states, which are indicated in Table 1.

TABLE 1

| TX_EN/RX_DV | TX_ER/RX_ER | 8B/10B Codes | State |
| --- | --- | --- | --- |
| 0 | 0 | <K28.5, D5.6> | Idle |
|   |   | <K28.5, D16.2> |   |
| 0 | 1 | <K23.7> | Carrier Extend |
| 1 | 0 | <Dxx.y> | Normal Data |
| 1 | 1 | <K30.7> | Error |

As shown in Table 1, the four states are Idle, Carrier Extend, Normal data and Error. When TX_EN and TX_ER are put into Normal Data mode, TX_EN is high and TX_ER is low. The data in TXD pins are accepted in one transceiver 54 (56) and the data is produced in the RXD pins of the other transceiver 56 (54) with the RX_DV and RX_ER showing Normal Data mode. So, there is data transmission between the interface devices 52 and 58 through the two transceivers 54 and 56 in Normal Data mode.

For the other three modes of TX_ER and TX_EN, the transceiver 54 (56) does not accept data from TXD pins but sends its own special data and produces the data in the RXD pins of the other transceiver 56 (54) with the same state of TX_EN and TX_ER in RX_DV and RX_ER. When TX_EN is deasserted and TX_ER is asserted, then the encoder will generate a carrier extend consisting of two K23.7 codes. If TX_EN and TX_ER are both asserted then the encoder will generate a special event. This special event comprises one or more code-groups that are not part of the valid data or delimiter set somewhere in the frame being transmitted. In the preferred embodiment, this special event is a K30.7 code, which is the last of the control codes defined in the 8b10b specification. This code does not provide a comma pattern, so it does not define the byte boundary in the data stream.

The encoder sends the IDLE character set when no payload data is available to be sent and TX_ENTX_ER are deasserted. IDLE comprises a K28.5 code and either a D5.6 or D16.2 character. Since data is latched into the TLK2500 16 bits at a time, this in turn is converted into two 10-bit codes that are transmitted sequentially. This means IDLE will comprise two 10 bit codes, being 20 bits wide that is transmitted during a single cycle. IDLE will replace data during initial synchronization or resynchronization, until synchronization is achieved.

When a reset from the primary interface device 52 needs to be communicated to the secondary side 58, the primary device 52 communicates this reset to a communication control circuitry block with the interface device 52. The control block takes control of the serial link 60 and sends a unique pattern of Extends and Idles through TX_EN and TX_ER, depending on the CRC mode of the primary side.

FIG. 5 shows a complete reset procedure. Here UUT0 represents the signals from primary interface device 52 and UUT1 represents signals from secondary interface device 58. (UUT stands for Unit Under Test.) The reset procedure starts if UUT0:SERIAL_RST is set high. UUT0:PCI_RST_L is an external reset signal to the primary device 52 which signals set when it is low. This signal causes UUT0:SERIAL_LRST to go high.

When there is a reset, UUT0:TX_EN signal will go low and UUT0:TX_ER signal will toggle to send Extends and Idles. An Idle is signaled if both the TX_ER and TX_EN is low and an Extend is signaled when TX_ER is high and TX_EN is low. The pattern sent from primary device 52 is replicated in UUT1:RX_DV and UUT1:RXER_PASS of the secondary device 58. RXER_PASS is an input pin of the interface device 52 (58) that is connected to the RX_ER pin of the transceiver 54 (56).

After the secondary device 58 receives the reset pattern, the UUT1:XMT_EN (transmit enable) signal in secondary device 58 goes low and RCVD_SEC_DPATH_RST goes low, causing a reset in secondary interface device 58. XMT_EN disables normal operation and starts the RESET procedure. When UUT1:RXER_PASS goes low after the final Extend, several clock cycles later, a confirmation pattern is produced in UUT1:TX_EN and UUT1:TX_ER which is passed to UUT0:RX_DV and UUT0:RXER_PASS as a confirmation of RESET.

After the confirmation is received in primary device 52, the reset procedure completes; XMT_EN in both primary and second devices goes high. If the primary device 52 does not get back the confirmation within certain time due to the error in the link (or any other reason), the control block in the primary device 52 tries to send reset again. In this manner, the system is more robust.

In this example, the reset pattern comprises three parts, namely a header, mode information and a tail. The header comprises three Extends, three Idles and three Extends again. The mode information part comprises three sets of three Extends and Idles for the CRC Mode or three sets of three Idles and Extends for Non-CRC mode (see Table 2). The tail part consists of sixty-eight Extends. The tail part can be made to have a variable extend, so that it will transmit extends as long as there is a reset in the primary.

One advantage of the preferred embodiment implementation is that all the Extends and Idles in the reset pattern are more than one clock cycle wide. This feature helps to avoid an erroneous reset in the secondary side due to any misleading spikes in the link.

The confirmation pattern is same as the reset pattern except that the mode information bits are reversed and its tail is only three Extends wide. It is preferable that the mode information be inverted for the confirmation so that any electromagnetic cross-talk that might occur between the two lines in link 60 will not be confused for a confirmation. With this technique, echo on the line will not be misinterpreted as a confirmation.

In an alternate embodiment, the reset procedure can been done without the reset confirmation. This embodiment is not preferred, however, since it might mislead to a secondary reset due to a breakdown in the serial link. Further, the bits in the confirmation packets can be kept in the same pattern as the reset pattern but this approach might not catch the signals that have been induced in the high speed domain (e.g., crosstalk).

Figure 6:
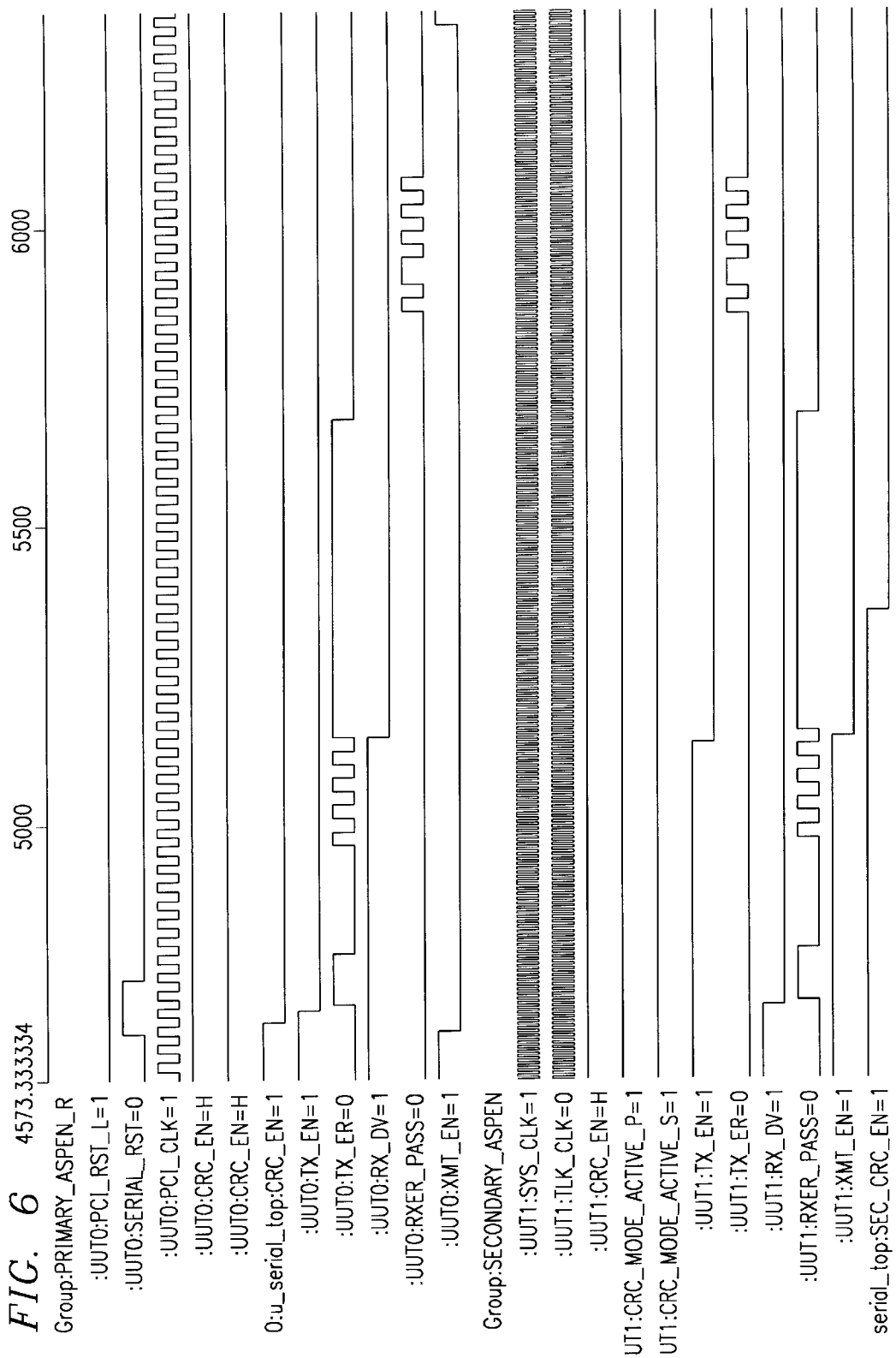

FIG. 6 shows a timing diagram for the non-CRC mode. In this case, there is no external reset, PCI_RST_L is high, but an internal reset, a pulse in SERIAL_RST, occurs in the primary interface device 52, which causes the reset procedure. In this case, the CRC mode signal CRC_EN in the primary side goes to low indicating that communication is to occur in the Non-CRC mode. The reset procedure makes a similar change in the secondary interface device 58 by changing the signal SEC_CRC_EN from high to low. A different pattern is communicated during this reset to show the Non-CRC mode of operation. As shown in FIG. 6, the mode information part of the packet includes Idles followed by Extends to indicate Non-CRC mode. Table 2 summarizes the reset pattern for both the CRC and non-CRC modes.

TABLE 2

| Redundancy Mode | To/From | Header | Mode Infomation | Tail |
| --- | --- | --- | --- | --- |
| CRC Mode | Primary/Secondary | EIE | EIEIEI | EEE . . . EE |
| CRC confirm | Secondary/Primary | EIE | IEIEIE | EEE |
| Non-CRC Mode | Primary/Secondary | EIE | IEIEIE | EEE . . . EE |
| Non-CRC confirm | Secondary/Primary | EIE | EIEIEI | EEE |

Figure 7:
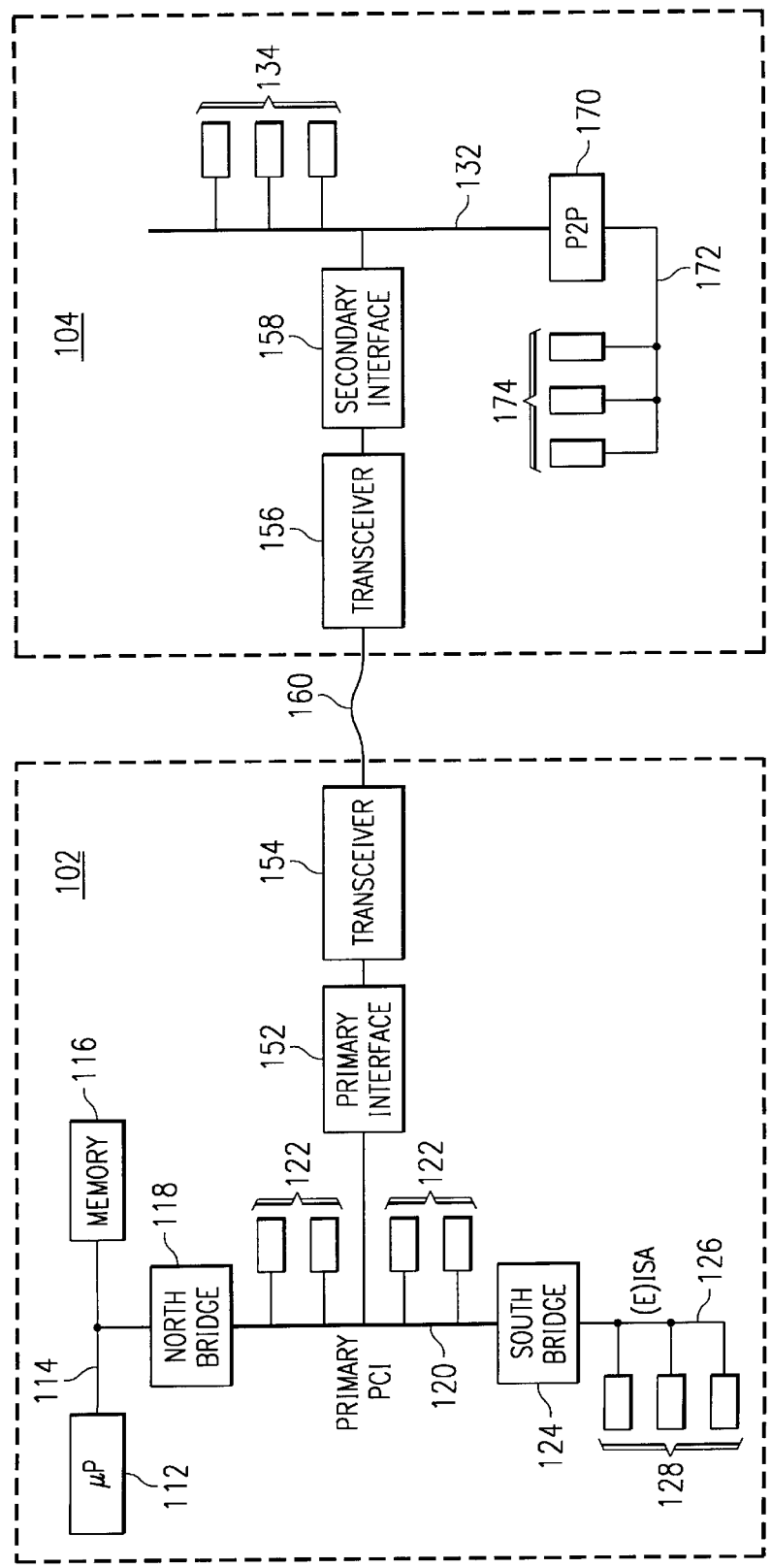
FIG. 7 is a block diagram of a computer system of the present invention.

Aspects of the present invention can be utilized in a number of systems. For example, FIG. 7 illustrates a block diagram of a portable (e.g., notebook or handheld) computer 102 and an associated docking station 104. Using the present invention, the portable computer 102 can be coupled to the docking station 104 using a category 5 cable 160. This simple plug-in connection is convenient and reliable.

The computer system 102 includes microprocessor 112 which is coupled by way of an internal bus 114 to memory system 116 and north bridge 118. Primary PCI bus 120 includes a number of slots 122 for connection of components such as hard disk drives, modems, CD ROM drives, DVD drives and network interface cards, as examples. South bridge 124 is provided for access to a different bus, e.g., (E)ISA bus, 126, which may have other components coupled to it by way of slots 128. Other details and examples described with respect to FIG. 1 also apply here.

As shown in FIG. 7, primary PCI bus 120 also includes a primary interface device 152, as described above. The primary interface device 152 is coupled to transceiver 154, which serializes the parallel data from PCI bus 120 and transmits it across serial link 160. The serial data is received at transceiver 156 and returned to parallel data to be transferred to secondary interface device 158. Data and control signals can further be transmitted in the opposite direction, that is from secondary side 158 to primary side 152.

FIG. 7 further illustrates a second PCI bus 132 and a third PCI bus 172 that is coupled to secondary PCI bus 132 through a PCI-to-PCI bridge 170. The PCI-to-PCI bridge 170 can be a conventional single chip device as illustrated in FIG. 7 or a serialized device such as illustrated in FIG. 3 or FIG. 4. In the latter case, the docking station 104 could be further coupled to a remote expansion box via a cable, as one example. As in the case of primary PCI bus 120, secondary PCI bus 132 includes a number of slots 134 for connection of components, and tertiary PCI bus 172 includes a number of slots 174 for connection of components.

As discussed above, the reset signal and mode information are communicated from one PCI bus to the other using control space of the coding scheme. This provides advantages over alternate schemes. For example, the reset signal could have been included in the PCI data packets instead of a completely separate circuit block handling the reset procedure. This approach, however, will tend to complicate the mode set procedure. Further, as a separate block this approach can be used in other designs for the similar kind of reset procedures through a serial link. Since the system can communicate the reset signal independent of other blocks of the design, it helps in modular design.

The block diagram of FIG. 7 can also be utilized in other systems. For example, small form-factor computers do not have room for much expansion. A cable interfaced to the exterior of the computer can be coupled to an expansion box that includes additional cards. Similarly, other computers that require remote expansion can utilize the benefits of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An interface device comprising:
   a parallel input configured to be coupled to a bus;
   a parallel data output;
   at least two control output nodes;
   data control circuitry coupled to the at least two control output nodes, the data control circuitry utilizing a coding scheme to generate one of a set of control codes to be provided to the at least two control output nodes; and
   reset control circuitry coupled to the at least two control output nodes, the reset control circuitry generating a specified sequence of control codes on the at least two control outputs to indicate a reset condition,
   wherein the reset control circuitry generates a first sequence of control codes to indicate a reset into a first mode and a second sequence of control codes to indicate a reset into a second mode.

2. A method of communicating from a processor to a peripheral device, the method comprising:
   communicating from the processor an indication that the system is being reset, the indication being communicated along at least one line of a parallel bus;
   receiving the indication at a first interface device;
   communicating the indication from the interface device and along a serial link using control codes of an encoding/decoding scheme of the interface device;
   receiving the indication at a second interface device, the second interface device coupled to the first interface device through the serial link; and communicating a confirmation from the second interface device to the first interface device, the confirmation indicating that the indication from the first interface device has been received,
   wherein the confirmation comprises a sequence of control codes of the encoding/decoding scheme, at least a portion of the confirmation sequence being an inverted copy of a sequence of control codes communicate the indication from the first interface device.

3. A method of communicating from a processor to a peripheral device, the method comprising:
   communicating from the processor an indication that the system is being reset, the indication being communicated alone at least one line of a parallel bus;
   receiving the indication at a first interface device;
   communicating the indication from the interface device and alone a serial link using control codes of an encoding/decoding scheme of the interface device; and
   receiving the indication at a second interface device, the second interface device coupled to the first interface device through the serial link,
   wherein communicating the indication includes communicating information relating to a mode of operation.

4. The method of claim 3 wherein the information relating to the mode of operation comprises information relating to a redundancy mode of operation.

5. A computer system comprising:
   a processor;
   a memory system coupled to the processor through a processor bus;
   a first bridge circuit coupled between the processor bus and a first expansion bus;
   a plurality of peripheral devices coupled to the first expansion bus;
   a first interface device coupled to the first expansion bus, the first interface device including a plurality of parallel data output nodes and at least two control output nodes;
   a first transceiver device with data inputs coupled to the data output nodes and with at least two control input nodes coupled to the at least two control output nodes of the first interface device;
   a serial link;
   a second transceiver device coupled to the first transceiver device by the serial link;
   a second interface device coupled between the second transceiver device and a second expansion bus; and
   at least one additional peripheral device coupled to the second expansion bus;
   wherein the first and second interface devices each include data control circuitry utilizing a coding scheme to generate one of a set of control codes to be provided to the at least two control output nodes;
   wherein the first interface device includes reset control circuitry generating a specified sequence of control codes on the at least two control outputs to communicate information from the first interface device to the second interface device, the information relating to a state of the second expansion bus;
   wherein the first and second transceivers both utilize an 8B/10B encoding/decoding scheme to communicate data across the serial link;
   wherein the specified sequence of control codes comprises a sequence of Idle and Extend codes; and
   wherein the specified sequence of control codes is used to communicate information that the second expansion bus should be reset.

6. The system of claim 5 wherein the specified sequence of control codes is used to communicate information that the second expansion bus should be reset into a first of a plurality of modes.

7. The system of claim 6 wherein the plurality of modes comprise modes relating to the redundancy scheme used in communication across the serial link.

8. A computer system comprising:

a processor;

a memory system coupled to the processor through a processor bus;

a first bridge circuit coupled between the processor bus and a first expansion bus;

a plurality of peripheral devices coupled to the first expansion bus;

a first interface device coupled to the first expansion bus, the first interface device including a plurality of parallel data output nodes and at least two control output nodes;

a first transceiver device with data inputs coupled to the data output nodes and with at least two control input nodes coupled to the at least two control output nodes of the first interface device;

a serial link;

a second transceiver device coupled to the first transceiver device by the serial link;

a second interface device coupled between the second transceiver device and a second expansion bus; and at least one additional peripheral device coupled to the second expansion bus;

wherein the first and second interface devices each include data control circuitry utilizing a coding scheme to generate one of a set of control codes to be provided to the at least two control output nodes;

wherein the first interface device includes reset control circuitry generating a specified sequence of control codes on the at least two control outputs to communicate information from the first interface device to the second interface device, the information relating to a state of the second expansion bus;

wherein the first and second transceivers both utilize an 8B/10B encoding/decoding scheme to communicate data across the serial link;

wherein the specified sequence of control codes comprises a sequence of Idle and Extend codes;

wherein the specified sequence of control codes is used to communicate information that the second expansion bus should be reset; and wherein the specified sequence of control codes is used to communicate information that the second expansion bus should be reset into a one of a plurality of modes.

9. The system of claim 8 wherein the plurality of modes comprise modes relating to the redundancy scheme used in communication across the serial link.

10. A computer system comprising:

a processor;

a memory system coupled to the processor through a processor bus;

a first bridge circuit coupled between the processor bus and a first expansion bus;

a plurality of peripheral devices coupled to the first expansion bus;

a first interface device coupled to the first expansion bus, the first interface device including a plurality of parallel data output nodes and at least two control output nodes;

a first transceiver device with data inputs coupled to the data output nodes and with at least two control input nodes coupled to the at least two control output nodes of the first interface device;

a serial link;

a second transceiver device coupled to the first transceiver device by the serial link;

a second interface device coupled between the second transceiver device and a second expansion bus; and at least one additional peripheral device coupled to the second expansion bus;

wherein the first and second interface devices each include data control circuitry utilizing a coding scheme to generate one of a set of control codes to be provided to the at least two control output nodes;

wherein the first interface device includes reset control circuitry generating a specified sequence of control codes on the at least two control outputs to communicate information from the first interface device to the second interface device, the information relating to a state of the second expansion bus;

wherein the first and second transceivers both utilize an 8B/10B encoding/decoding scheme to communicate data across the serial link;

wherein the specified sequence of control codes comprises a sequence of Idle and Extend codes;

wherein the second interface device includes confirmation circuitry generating a confirmation sequence of control codes, the confirmation sequence to be communicated to the first interface device through the serial link; and wherein a portion of the confirmation sequence comprises an inverted version of the specified sequence.

11. A computer system comprising:

a processor;

a memory system coupled to the processor through a processor bus;

a first bridge circuit coupled between the processor bus and a first expansion bus;

a plurality of peripheral devices coupled to the first expansion bus;

a first interface device coupled to the first expansion bus, the first interface device including a plurality of parallel data output nodes and at least two control output nodes;

a first transceiver device with data inputs coupled to the data output nodes and with at least two control input nodes coupled to the at least two control output nodes of the first interface device;

a serial link;

a second transceiver device coupled to the first transceiver device by the serial link;

a second interface device coupled between the second transceiver device and a second expansion bus; and at least one additional peripheral device coupled to the second expansion bus;

wherein the first and second interface devices each include data control circuitry utilizing a coding scheme to generate one of a set of control codes to be provided to the at least two control output nodes;

wherein the first interface device includes reset control circuitry generating a specified sequence of control codes on the at least two control outputs to communicate information from the first interface device to the second interface device, the information relating to a state of the second expansion bus;

wherein the first and second transceivers both utilize an 8B/10B encoding/decoding scheme to communicate data across the serial link;

wherein the specified sequence of control codes comprises a sequence of Idle and Extend codes; and wherein the first expansion bus operates at a first clock rate and wherein the information relating to a state of the second expansion bus is communicated from the first interface device to the second interface device at a second clock rate that is faster than the first clock rate.

* * * * *